(12) United States Patent
Chen et al.

(10) Patent No.: US 10,184,066 B2
(45) Date of Patent: Jan. 22, 2019

(54) ABRASION-RESISTANT COATING MATERIAL AND METHOD OF USING THE SAME

(71) Applicant: Changjiang River Scientific Research Institute, Changjiang Water Resources Commission, Wuhan (CN)

(72) Inventors: Liang Chen, Wuhan (CN); Zhen Li, Wuhan (CN); Zaiqin Wang, Wuhan (CN); Huaquan Yang, Wuhan (CN); Wei Han, Wuhan (CN); Chengjing Xiao, Wuhan (CN); Tao Wei, Wuhan (CN); Xiaomei Shao, Wuhan (CN); Jing Feng, Wuhan (CN); Lingmin Liao, Wuhan (CN); Jian Zhang, Wuhan (CN); Da Zhang, Wuhan (CN); Xiaohu Yan, Wuhan (CN)

(73) Assignee: CHANGJIANG RIVER SCIENTIFIC RESEARCH INSTITUTE, CHANGJIANG WATER RESOURCES COMMISSION, Wuhan (CN)

(*) Notice: Subject to any disclaimer, the term of this patent is extended or adjusted under 35 U.S.C. 154(b) by 0 days.

(21) Appl. No.: 14/707,013

(22) Filed: May 8, 2015

(65) Prior Publication Data
US 2015/0240117 A1    Aug. 27, 2015

Related U.S. Application Data

(63) Continuation-in-part of application No. PCT/CN2013/072851, filed on Mar. 19, 2013.

(30) Foreign Application Priority Data

Nov. 14, 2012 (CN) .......................... 2012 1 0453370

(51) Int. Cl.
C09D 177/04 (2006.01)
C09D 175/02 (2006.01)
(Continued)

(52) U.S. Cl.
CPC ............ C09D 177/04 (2013.01); C04B 26/14 (2013.01); C04B 41/009 (2013.01);
(Continued)

(58) Field of Classification Search
CPC .. C09D 177/04; C09D 163/00; C09D 175/02; C09B 26/14; C09B 41/009;
(Continued)

(56) References Cited

U.S. PATENT DOCUMENTS 3,629,181 A * 12/1971 Heer ................... C08G 59/184
252/182.13
4,265,957 A * 5/1981 Severance .............. E04F 15/12
404/82

(Continued)

FOREIGN PATENT DOCUMENTS

CN     1137212 C   *  2/2004
CN     102504670 A  *  6/2012
JP     2006348707 A *  12/2006

OTHER PUBLICATIONS

Jambusaria et al. Polymer Journal vol. 6, pp. 333-340, 1974, Bisphenol-Furfural. A high-temperature thermosettign resin.*

*Primary Examiner* — Frank J Vineis
*Assistant Examiner* — Alicia J Sawdon
(74) *Attorney, Agent, or Firm* — Matthias Scholl P.C.; Matthias Scholl

(57) ABSTRACT

A coating material, including a bottom layer, a middle layer and a surface layer. The bottom layer is an epoxy mortar having a thickness of between 1 and 3 mm, the middle layer is an epoxy resin adhesive having a thickness of between 0.1

(Continued)

and 0.5 mm, and the surface layer is a nanomaterial-modified polyaspartic having a thickness of between 0.3 and 0.5 mm. The epoxy resin adhesive has a viscosity of between 50 and 200 mPa·s.

6 Claims, 2 Drawing Sheets

(51) Int. Cl.
  *C04B 41/00* (2006.01)
  *C04B 41/52* (2006.01)
  *C04B 41/71* (2006.01)
  *C09D 163/00* (2006.01)
  *C08G 18/38* (2006.01)
  *C04B 26/14* (2006.01)
  *C04B 41/48* (2006.01)
  *C09J 163/00* (2006.01)

(52) U.S. Cl.
  CPC .......... *C04B 41/4853* (2013.01); *C04B 41/52* (2013.01); *C04B 41/71* (2013.01); *C08G 18/3821* (2013.01); *C09D 163/00* (2013.01); *C09D 175/02* (2013.01); *C09J 163/00* (2013.01); *Y10T 428/24967* (2015.01)

(58) Field of Classification Search
  CPC ..... C09B 41/4853; C09B 41/52; C09B 41/71; Y10T 428/31511
  See application file for complete search history.

(56) References Cited

U.S. PATENT DOCUMENTS

2009/0214791 A1* 8/2009 Evanson ............... C04B 41/009
  427/294
2011/0070387 A1* 3/2011 Schmidt ................ C08G 18/10
  428/36.91
2012/0041142 A1* 2/2012 Nennemann .......... B82Y 30/00
  524/590

* cited by examiner

2

ABRASION-RESISTANT COATING MATERIAL AND METHOD OF USING THE SAME

CROSS-REFERENCE TO RELATED APPLICATIONS

This application is a continuation-in-part of International Patent Application No. PCT/CN2013/072851 with an international filing date of Mar. 19, 2013, designating the United States, now pending, and further claims priority benefits to Chinese Patent Application No. 201210453370.1 filed Nov. 14, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to an abrasion-resistant coating material and use thereof.

Description of the Related Art

To prevent dams from abrasion caused by high speed water jet, organic composite materials are often coated on the surface of concrete used to make the dams. However, the organic composite materials, for example, epoxy mortar, often exhibit poor weather resistance, and tend to age, crack, warp, delaminate, and powder. Polyurea is a novel anti-abrasion eco-friendly material with excellent weather resistance, but it is expensive, and isocyanate, an essential component thereof, tends to react with water on the surface to produce blisters, which degrades the properties of the coating.

SUMMARY OF THE INVENTION

In view of the above-described problems, it is one objective of the invention to provide a coating material for use on the surface of a dam concrete that is economical and practical and features good abrasion resistance, adaptability and weather resistance.

It is another objective of the invention to provide a method for coating the coating material on the surface of a concrete dam.

To achieve the above objective, in accordance with one embodiment of the invention, there is provided a coating material, comprising a bottom layer, a middle layer, and a surface layer. The bottom layer is an epoxy mortar having a thickness of between 1 and 3 mm, the middle layer is an epoxy resin adhesive having a thickness of between 0.1 and 0.5 mm, and the surface layer is a nanomaterial-modified polyaspartic having a thickness of between 0.3 and 0.5 mm; and the epoxy resin adhesive has a viscosity of between 50 and 200 mPa·s.

In a class of this embodiment, an initial viscosity of the epoxy resin is between 20,000 and 50,000 mPa·s, a surface drying time thereof is between 1 and 5 hours, and a curing time thereof is between 5 and 20 hours.

In a class of this embodiment, the epoxy resin adhesive comprises a first component and a second component, the first component is a modified bisphenol-A epoxy resin comprising between 50 and 60 parts by weight of bisphenol-A epoxy resin, between 20 and 30 parts by weight of furfural, and between 20 and 30 parts by weight of acetone; the second component is a diamine or polyamine curing agent; a weight ratio of the first component to the second component is between 4:1 and 6:1; the epoxy resin adhesive has a surface drying time of between 1 and 2 hours, and a curing time of between 0.5 and 2 hours.

In a class of this embodiment, the nanomaterial-modified polyaspartic comprises a first component and a second component; the first component is obtained by polymer grafting between 2 and 10 parts by weight of an inorganic nanomaterial to between 90 and 98 parts by weight of isocyanate; the second component is obtained by adding between 0 and 1.2 parts by weight of iron black, between 0 and 3 parts by weight of titanium dioxide, and between 0 and 0.3 part by weight of a dispersant to between 5 and 10 parts by weight of a reactive diluent, stirring and collecting a filtrate, and adding to the filtrate between 70 and 80 parts by weight of polyaspartate.

In a class of this embodiment, the nanomaterial-modified polyaspartic comprises a first component and a second component; the first component is obtained by polymer grafting between 1 and 6 parts by weight of an inorganic nanomaterial to between 50 and 60 parts by weight of isocyanate; the second component is obtained by adding between 0 and 3 parts by weight of iron black, between 0 and 5 parts by weight of titanium dioxide, and between 0 and 1 part by weight of a dispersant to between 5 and 15 parts by weight of a reactive diluent, stirring and collecting a filtrate, and adding to the filtrate between 20 and 40 parts by weight of polyaspartate.

In a class of this embodiment, in preparation of the first component of the nanomaterial-modified polyaspartic, the inorganic nanomaterial is mixed with isocyanate at a pressure of between 1 and 3 megapascal for between 1 and 4 hours.

In a class of this embodiment, the inorganic nanomaterial is nano $SiO_2$.

In a class of this embodiment, the reactive diluent is propylene carbonate, toluene, xylene, or cyclohexane.

In another aspect, the invention provides a method for coating the coating material on a surface of a dam concrete, the method comprising: 1) coating between 1 and 3 mm of the epoxy mortar as the bottom layer on the surface of the dam concrete; 2) allowing the bottom layer to cure completely, and coating between 0.1 and 0.5 mm of the epoxy resin adhesive as the middle layer on a surface of the bottom layer; and 3) prior to surface drying of the middle layer, coating the nanomaterial-modified polyaspartic for one to three times as a surface layer with a thickness of between 0.3 and 0.5 mm on a surface of the middle layer.

The stirring is carried out using a low speed machine to prevent bubbling.

Low ambient temperature increases the viscosity of the epoxy mortar and reduces the fluidity, so that the epoxy mortar should first be heated in a 40-50° C. water bath to reach a low viscosity and then coated.

Advantages of the coating material according to one embodiment of the invention are summarized as follows: 1) Underwater steel ball tests show that, 72 hours later, the coated concrete basically keeps intact, with a mass loss of less than 2%, which shows the coating material can effectively protect the concrete dam from abrasion. 2) The bottom layer of the coating material has high adhesion and adaptability with the surface of the concrete, the middle layer has good adhesion with the bottom layer and the surface layer and features flexibility, and the surface layer features good abrasion properties and good age resistance. 3) The coating material exhibits specific properties which are not possessed by its components, for example, it can be directly applied to damp ground, has strong bonding capacity with concrete, and strong abrasion and age resistance, and remains original color after long time's exposure in the sun. 4) The bonding strength between the surface layer of the coating material and the concrete exceeds 3.5 megapascal, thereby ensuring the reliable adhesion and avoiding detachment of the coating material.

The coating material can resist the destruction from the sand-containing current and bed load, thereby effectively protecting the safety of the dam, and prolonging the service life thereof. The bonding capacity between the coating material and the concrete is strong, the surface layer of the coating material exhibits excellent weather resistance, thereby ensuring the reliable adhesion and avoiding detachment and powdering of the coating material even in a long term's utilization. The coating material is modified using polyurea, which saves the raw material, and the modified coating material is economic and practical, features good abrasion properties, good adaptability and weather resistance, and can meet the requirement of concrete dams for abrasion resistance.

DETAILED DESCRIPTION OF THE EMBODIMENTS

Figure 1:
FIG. 1 is a physical appearance of a concrete sample containing no abrasion resistant coating layer after a scouring test in accordance with one embodiment of the invention.

For further illustrating the invention, experiments detailing a coating material and use thereof are described hereinbelow combined with the drawings. It should be noted that the following examples are intended to describe and not to limit the invention.

As used herein, the term "polyaspartic" refers to an aliphatic polyurea derived from the reaction product of an aliphatic polyisocyanate and a polyaspartic ester.

Example 1

Preparation of a Bottom Layer of Coating Material

The bottom layer is an epoxy mortar having an initial viscosity of 20,000 mPa·s, a surface drying time of 5 hours, and a curing time of 20 hours.

Preparation of a Middle Layer of Coating Material

The middle layer is an epoxy resin adhesive comprising a first component and a second component with a weight ratio thereof being 4:1. The first component is a modified bisphenol-A epoxy resin comprising 50 parts by weight of bisphenol-A epoxy resin, 25 parts by weight of furfural, and 25 parts by weight of acetone; the second component is a diamine curing agent, that is, m-phenylenediamine. The epoxy resin adhesive has a viscosity of 200 mPa·s, a surface drying time of 2 hours, and a curing time of 2 hours.

Preparation of a Surface Layer of Coating Material

The surface layer is nanomaterial-modified polyaspartic comprising a first component and a second component. In preparation of the first component, 2 parts by weight of nano $SiO_2$ are mixed with 98 parts by weight of isocyanate at a pressure of 2 megapascal for 4 hours. The second component is obtained by adding 1.2 parts by weight of iron black, 0.3 part by weight of a dispersant to 10 parts by weight of a reactive diluent, that is, xylene, stirring and collecting a filtrate, and adding to the filtrate 80 parts by weight of polyaspartate.

The stirring is carried out using a low speed machine to prevent bubbling.

Coating Method

The floating ash on the surface of a concrete sample is removed, and 1 mm of the bottom layer is coated on the surface. After the bottom layer is completely cured, 0.5 mm of the middle layer is coated on the surface of the bottom layer. Prior to the surface drying of the middle layer, coat the surface layer thrice on the surface of the middle surface until the thickness reaches 0.5 mm. Low ambient temperature increases the viscosity of the epoxy mortar and reduces the fluidity, and the epoxy mortar can first be heated in a 40-50° C. water bath to reach a low viscosity and then coated. After the surface layer is completely cured, a concrete sample 1 containing an abrasion resistant coating layer is obtained.

Figure 2:
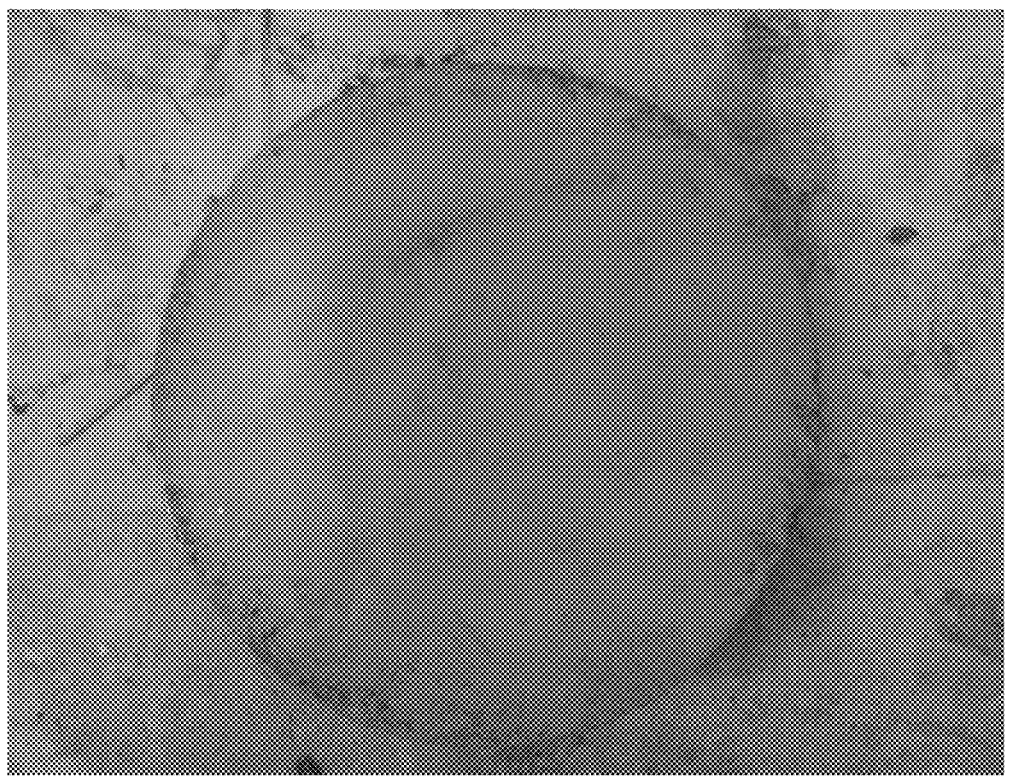
FIG. 2 is a physical appearance of a concrete sample containing an abrasion resistant coating layer after a scouring test in accordance with one embodiment of the invention.

Scouring tests are carried out respectively for 72 hours to the concrete sample 1 containing an abrasion resistant coating layer and a concrete sample containing no abrasion resistant coating layer using an underwater steel ball method. The results are shown in FIGS. 1 and 2. The concrete sample containing no abrasion resistant coating layer is seriously destroyed, with a mass loss of 8.5%. The concrete sample 1 containing an abrasion resistant coating layer basically keeps intact, with a mass loss of less than 2%.

Figure 3:
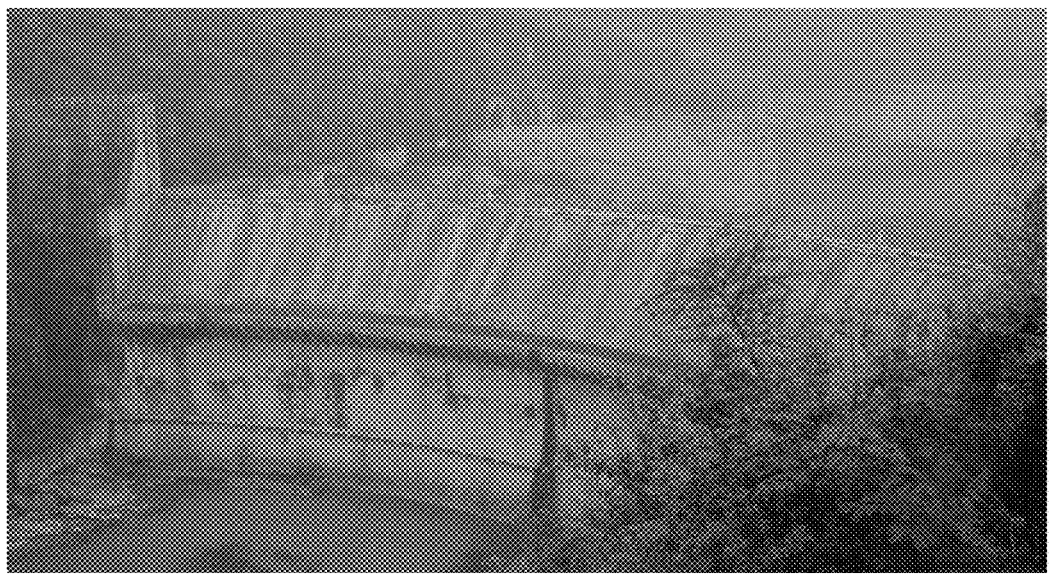
FIG. 3 is a physical appearance of a dam containing an abrasion resistant coating layer in accordance with one embodiment of the invention.
Figure 4:
FIG. 4 is a physical appearance of a dam containing an abrasion resistant coating layer after one year of use in accordance with one embodiment of the invention.

The surface of a dam concrete is cleaned using a hydraulic giant, and 2 mm of the bottom layer is coated on the dam surface after drying. After the bottom layer is completely cured, 0.4 mm of the middle layer is coated on the surface of the bottom layer. Prior to the surface drying of the middle layer, coat the surface layer twice on the surface of the middle surface until the thickness reaches 0.4 mm. After the surface layer is completely cured, a concrete dam containing an abrasion resistant coating layer is obtained. One year later, the results are shown in FIGS. 3 and 4. Prior to coating the coating material, the surface of the concrete dam is seriously scoured and destroyed. One year later after coating the material, the physical appearance of the dam basically keeps intact, which shows the coating material can effectively protect the concrete dam from abrasion.

Example 2

Preparation of a Bottom Layer of Coating Material

The bottom layer is an epoxy mortar having an initial viscosity of 50,000 mPa·s, a surface drying time of one hour, and a curing time of 5 hours.

Preparation of a Middle Layer of Coating Material

The middle layer is an epoxy resin adhesive comprising a first component and a second component with a weight ratio thereof being 5:1. The first component is a modified bisphenol-A epoxy resin comprising 60 parts by weight of bisphenol-A epoxy resin, 20 parts by weight of furfural, and 30 parts by weight of acetone; the second component is a polyamine curing agent, that is, triethylamine. The epoxy resin adhesive has a viscosity of 100 mPa·s, a surface drying time of 1.5 hours, and a curing time of one hour.

Preparation of a Surface Layer of Coating Material

The surface layer is nanomaterial-modified polyaspartic comprising a first component and a second component. In preparation of the first component, 10 parts by weight of nano $SiO_2$ are mixed with 90 parts by weight of isocyanate at a pressure of 3 megapascal for one hour.

The second component is obtained by adding 3 parts by weight of titanium dioxide to 5 parts by weight of a reactive diluent, that is, cyclohexane, stirring and collecting a filtrate, and adding to the filtrate 70 parts by weight of polyaspartate.

The stirring is carried out using a low speed machine to prevent bubbling.

Coating Method

The floating ash on the surface of a concrete sample is removed, and 2 mm of the bottom layer is coated on the surface. After the bottom layer is completely cured, 0.4 mm of the middle layer is coated on the surface of the bottom layer. Prior to the surface drying of the middle layer, coat the surface layer twice on the surface of the middle surface until the thickness reaches 0.4 mm. Low ambient temperature increases the viscosity of the epoxy mortar and reduces the fluidity, and the epoxy mortar can first be heated in a 40-50° C. water bath to reach a low viscosity and then coated. After the surface layer is completely cured, a concrete sample 2 containing an abrasion resistant coating layer is obtained.

Example 3

Preparation of a Bottom Layer of Coating Material

The bottom layer is an epoxy mortar having an initial viscosity of 30,000 mPa·s, a surface drying time of 3 hours, and a curing time of 15 hours.

Preparation of a Middle Layer of Coating Material

The middle layer is an epoxy resin adhesive comprising a first component and a second component with a weight ratio thereof being 6:1. The first component is a modified bisphenol-A epoxy resin comprising 55 parts by weight of bisphenol-A epoxy resin, 30 parts by weight of furfural, and 20 parts by weight of acetone; the second component is a diamine curing agent, that is, hexanediamine. The epoxy resin adhesive has a viscosity of 50 mPa·s, a surface drying time of one hour, and a curing time of 0.5 hour.

Preparation of a Surface Layer of Coating Material

The surface layer is nanomaterial-modified polyaspartic comprising a first component and a second component. In preparation of the first component, 5 parts by weight of nano $SiO_2$ are mixed with 95 parts by weight of isocyanate at a pressure of 2 megapascal for 2 hours. The second component is obtained by adding 1 part by weight of iron black, 1 part by weight of titanium dioxide, and 0.1 part by weight of a dispersant to 8 parts by weight of a reactive diluent, that is, toluene, stirring and collecting a filtrate, and adding to the filtrate 75 parts by weight of polyaspartate.

The stirring is carried out using a low speed machine to prevent bubbling.

Coating Method

The floating ash on the surface of a concrete sample is removed, and 3 mm of the bottom layer is coated on the surface. After the bottom layer is completely cured, 0.1 mm of the middle layer is coated on the surface of the bottom layer. Prior to the surface drying of the middle layer, coat the surface layer once on the surface of the middle surface until the thickness reaches 0.3 mm. Low ambient temperature increases the viscosity of the epoxy mortar and reduces the fluidity, and the epoxy mortar can first be heated in a 40-50° C. water bath to reach a low viscosity and then coated. After the surface layer is completely cured, a concrete sample 3 containing an abrasion resistant coating layer is obtained.

Example 4

Preparation of a Bottom Layer of Coating Material

The bottom layer is an epoxy mortar having an initial viscosity of 40,000 mPa·s, a surface drying time of 3 hours, and a curing time of 18 hours.

Preparation of a Middle Layer of Coating Material

The middle layer is an epoxy resin adhesive comprising a first component and a second component with a weight ratio thereof being 5:1. The first component is a modified bisphenol-A epoxy resin comprising 60 parts by weight of bisphenol-A epoxy resin, 20 parts by weight of furfural, and 30 parts by weight of acetone; the second component is a polyamine curing agent, that is, triethylamine. The epoxy resin adhesive has a viscosity of 100 mPa·s, a surface drying time of 1.5 hours, and a curing time of one hour.

Preparation of a Surface Layer of Coating Material

The surface layer is nanomaterial-modified polyaspartic comprising a first component and a second component. In preparation of the first component, 6 parts by weight of nano $SiO_2$ are mixed with 60 parts by weight of isocyanate at a pressure of 2 megapascal for 3 hours. The second component is obtained by adding 5 parts by weight of titanium dioxide and one part by weight of a dispersant to 10 parts by weight of a reactive diluent, that is, propylene carbonate, stirring and collecting a filtrate, and adding to the filtrate 30 parts by weight of polyaspartate.

The stirring is carried out using a low speed machine to prevent bubbling.

Coating Method

The floating ash on the surface of a concrete sample is removed, and 2 mm of the bottom layer is coated on the surface. After the bottom layer is completely cured, 0.4 mm of the middle layer is coated on the surface of the bottom layer. Prior to the surface drying of the middle layer, coat the surface layer twice on the surface of the middle surface until the thickness reaches 0.4 mm. Low ambient temperature increases the viscosity of the epoxy mortar and reduces the fluidity, and the epoxy mortar can first be heated in a 40-50° C. water bath to reach a low viscosity and then coated. After the surface layer is completely cured, a concrete sample 4 containing an abrasion resistant coating layer is obtained.

Example 5

Preparation of a Bottom Layer of Coating Material

The bottom layer is an epoxy mortar having an initial viscosity of 40,000 mPa·s, a surface drying time of 3 hours, and a curing time of 18 hours.

Preparation of a Middle Layer of Coating Material

The middle layer is an epoxy resin adhesive comprising a first component and a second component with a weight ratio thereof being 5:1. The first component is a modified bisphenol-A epoxy resin comprising 60 parts by weight of bisphenol-A epoxy resin, 20 parts by weight of furfural, and 30 parts by weight of acetone; the second component is a polyamine curing agent, that is, triethylamine. The epoxy resin adhesive has a viscosity of 100 mPa·s, a surface drying time of 1.5 hours, and a curing time of one hour.

Preparation of a Surface Layer of Coating Material

The surface layer is nanomaterial-modified polyaspartic comprising a first component and a second component. In preparation of the first component, 3 parts by weight of nano SiO$_2$ are mixed with 50 parts by weight of isocyanate at a pressure of 2 megapascal for 3 hours. The second component is obtained by adding 3 parts by weight of iron black to 5 parts by weight of a reactive diluent, that is, toluene, stirring and collecting a filtrate, and adding to the filtrate 20 parts by weight of polyaspartate.

The stirring is carried out using a low speed machine to prevent bubbling.

Coating Method

The floating ash on the surface of a concrete sample is removed, and 2 mm of the bottom layer is coated on the surface. After the bottom layer is completely cured, 0.4 mm of the middle layer is coated on the surface of the bottom layer. Prior to the surface drying of the middle layer, coat the surface layer twice on the surface of the middle surface until the thickness reaches 0.4 mm. Low ambient temperature increases the viscosity of the epoxy mortar and reduces the fluidity, and the epoxy mortar can first be heated in a 40-50° C. water bath to reach a low viscosity and then coated. After the surface layer is completely cured, a concrete sample 5 containing an abrasion resistant coating layer is obtained.

Example 6

Preparation of a Bottom Layer of Coating Material

The bottom layer is an epoxy mortar having an initial viscosity of 40,000 mPa·s, a surface drying time of 3 hours, and a curing time of 18 hours.

Preparation of a Middle Layer of Coating Material

The middle layer is an epoxy resin adhesive comprising a first component and a second component with a weight ratio thereof being 5:1. The first component is a modified bisphenol-A epoxy resin comprising 60 parts by weight of bisphenol-A epoxy resin, 20 parts by weight of furfural, and 30 parts by weight of acetone; the second component is a polyamine curing agent, that is, triethylamine. The epoxy resin adhesive has a viscosity of 100 mPa·s, a surface drying time of 1.5 hours, and a curing time of one hour.

Preparation of a Surface Layer of Coating Material

The surface layer is nanomaterial-modified polyaspartic comprising a first component and a second component. In preparation of the first component, 1 part by weight of nano SiO$_2$ are mixed with 55 parts by weight of isocyanate at a pressure of 2 megapascal for 3 hours.

The second component is obtained by adding one part by weight of iron black, one part by weight of titanium dioxide, and 0.5 part by weight of a dispersant to 15 parts by weight of a reactive diluent, that is, toluene, stirring and collecting a filtrate, and adding to the filtrate 40 parts by weight of polyaspartate.

The stirring is carried out using a low speed machine to prevent bubbling.

Coating Method

The floating ash on the surface of a concrete sample is removed, and 2 mm of the bottom layer is coated on the surface. After the bottom layer is completely cured, 0.4 mm of the middle layer is coated on the surface of the bottom layer. Prior to the surface drying of the middle layer, coat the surface layer twice on the surface of the middle surface until the thickness reaches 0.4 mm. Low ambient temperature increases the viscosity of the epoxy mortar and reduces the fluidity, and the epoxy mortar can first be heated in a 40-50° C. water bath to reach a low viscosity and then coated. After the surface layer is completely cured, a concrete sample 6 containing an abrasion resistant coating layer is obtained.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A coating material, consisting of a bottom layer, a middle layer, and a surface layer; wherein:
   the bottom layer consists of an epoxy mortar having a thickness of critically between 1 and 3 mm;
   the middle layer consists of an epoxy resin adhesive having a thickness of critically between 0.1 and 0.5 mm;
   the surface layer is a polyaspartic comprising a nanomaterial grafted to an isocyanate and having a thickness of critically between 0.3 and 0.5 mm;
   the epoxy mortar has a viscosity of between 20,000 and 50,000 mPa·s; and
   the epoxy resin adhesive has a viscosity of critically between 50 and 200 mPa·s;
   the epoxy resin adhesive consists of a first component and a second component, the first component consists of between 50 and 60 parts by weight of bisphenol-A epoxy resin, between 20 and 30 parts by weight of furfural, and between 20 and 30 parts by weight of acetone; the second component is a diamine or polyamine curing agent; and a weight ratio of the first component to the second component is between 4:1 and 6:1.

2. The material of claim 1, wherein a surface drying time of the epoxy mortar is between 1 and 5 hours, and a curing time thereof is between 5 and 20 hours.

3. The material of claim 1, wherein a surface drying time of the epoxy resin adhesive is between 1 and 2 hours, and a curing time thereof is between 0.5 and 2 hours.

4. The material of claim 1, wherein the polyaspartic comprises a first component and a second component; the first component is obtained by polymer grafting between 1 and 6 parts by weight of an inorganic nanomaterial to between 50 and 60 parts by weight of isocyanate; and the second component is obtained by adding between 0 and 3 parts by weight of iron black, between 0 and 5 parts by weight of titanium dioxide, and between 0 and 1 part by weight of a dispersant to between 5 and 15 parts by weight of a reactive diluent, stirring and collecting a filtrate, and adding to the filtrate between 20 and 40 parts by weight of polyaspartate.

5. The material of claim 4, wherein the inorganic nanomaterial is nano SiO$_2$.

6. The material of claim 4, wherein the reactive diluent is propylene carbonate, toluene, xylene, or cyclohexane.

* * * * *